US008823298B2

(12) United States Patent
He et al.

(10) Patent No.: US 8,823,298 B2
(45) Date of Patent: Sep. 2, 2014

(54) APPARATUS AND METHOD OF BRAKING APPLIED IN A LAUNDRY TREATING APPLIANCE

(75) Inventors: Biao He, Saint Joseph, MI (US); Qiang Mei, Stevensville, MI (US); Fabio E. Rosa, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 269 days.

(21) Appl. No.: 13/419,743

(22) Filed: Mar. 14, 2012

(65) Prior Publication Data
US 2013/0241449 A1  Sep. 19, 2013

(51) Int. Cl.
H02P 3/00 (2006.01)
(52) U.S. Cl.
USPC ........... 318/375; 318/362; 318/374; 318/376; 318/432; 318/599; 318/811

(58) Field of Classification Search
CPC .................. G05B 11/28; H02P 7/29
USPC .......... 318/400.01, 400.14, 400.15, 599, 799, 318/432, 434, 362, 375, 376, 430, 437, 811, 318/374
See application file for complete search history.

(56) References Cited

U.S. PATENT DOCUMENTS

| 6,078,156 A | 6/2000 | Spurr |
| 6,257,027 B1 * | 7/2001 | Imai .............................. 68/12.12 |
| 6,445,879 B1 | 9/2002 | Youn et al. |
| 7,592,766 B2 * | 9/2009 | Patel et al. ............... 318/400.02 |
| 7,741,796 B2 | 6/2010 | Poyhonen et al. |
| 2003/0020431 A1 * | 1/2003 | Kiuchi et al. ................. 318/779 |
| 2010/0050703 A1 | 3/2010 | Maekawa et al. |
| 2010/0079104 A1 * | 4/2010 | Becker et al. ................. 318/802 |

\* cited by examiner

Primary Examiner — Antony M Paul

(57) ABSTRACT

A method of operating a laundry treating appliance to control a rotational speed of a drum to move the laundry within the drum according to a predetermined category of movement.

9 Claims, 7 Drawing Sheets

APPARATUS AND METHOD OF BRAKING APPLIED IN A LAUNDRY TREATING APPLIANCE

BACKGROUND

Laundry treating appliances, such as clothes washers, refreshers, and non-aqueous systems, may have a configuration based on a rotating drum that defines a treating chamber in which laundry items are placed for treating. The laundry treating appliance may have a controller that may control a motor to rotate the drum according to one of several pre-programmed cycles of operation. In some cycles of operation, the rotation speed may be high, e.g., hundreds of RPM. It may be necessary to halt the rotation of the drum quickly, in which case braking will need to be applied to the drum to halt the rotation. One example of such braking is regenerative braking where current flow in the motor is reversed, causing the motor to become a power generator to actively retard the rotation. However, the power generated by the motor during braking increases the DC voltage in the drive circuit to a level where it may exceed the design voltage of the drive circuit. One known solution includes "soft braking" by selectively turning transistors in the motor drive circuit on and off, thereby keeping the regenerative voltage from the motor below a predetermined threshold. Another known solution includes applying a switch and a dynamic braking resistor to discharge excess voltage (sometimes called a chopper circuit). Another known solution is to turn off the motor, thereby allowing inertia and friction to bring the drum to a halt.

BRIEF SUMMARY

According to an embodiment of the invention, a method of actively braking a laundry treating appliance having a motor and a motor driver includes transmitting a PWM control signal to the motor driver to apply torque to the motor, determining the speed of the motor, calculating the stator flux, comparing a detected voltage resulting from applying torque to the motor to a reference voltage, and changing the PWM control signal based on the stator flux.

In another aspect of the invention, an integrated motor control unit for braking a motor in a laundry treating appliance includes a rectifier to convert AC power to DC voltage, a capacitor filter to smooth the DC voltage from the rectifier, a motor driver to drive the motor based on the DC voltage from the capacitor filter, and a microcontroller that controls the motor driver. The microcontroller has an active braking algorithm, and is configured to detect current flowing between the motor driver and the motor and to apply the active braking algorithm to brake the motor using direct torque control based on the current flow.

DETAILED DESCRIPTION

Figure 1:
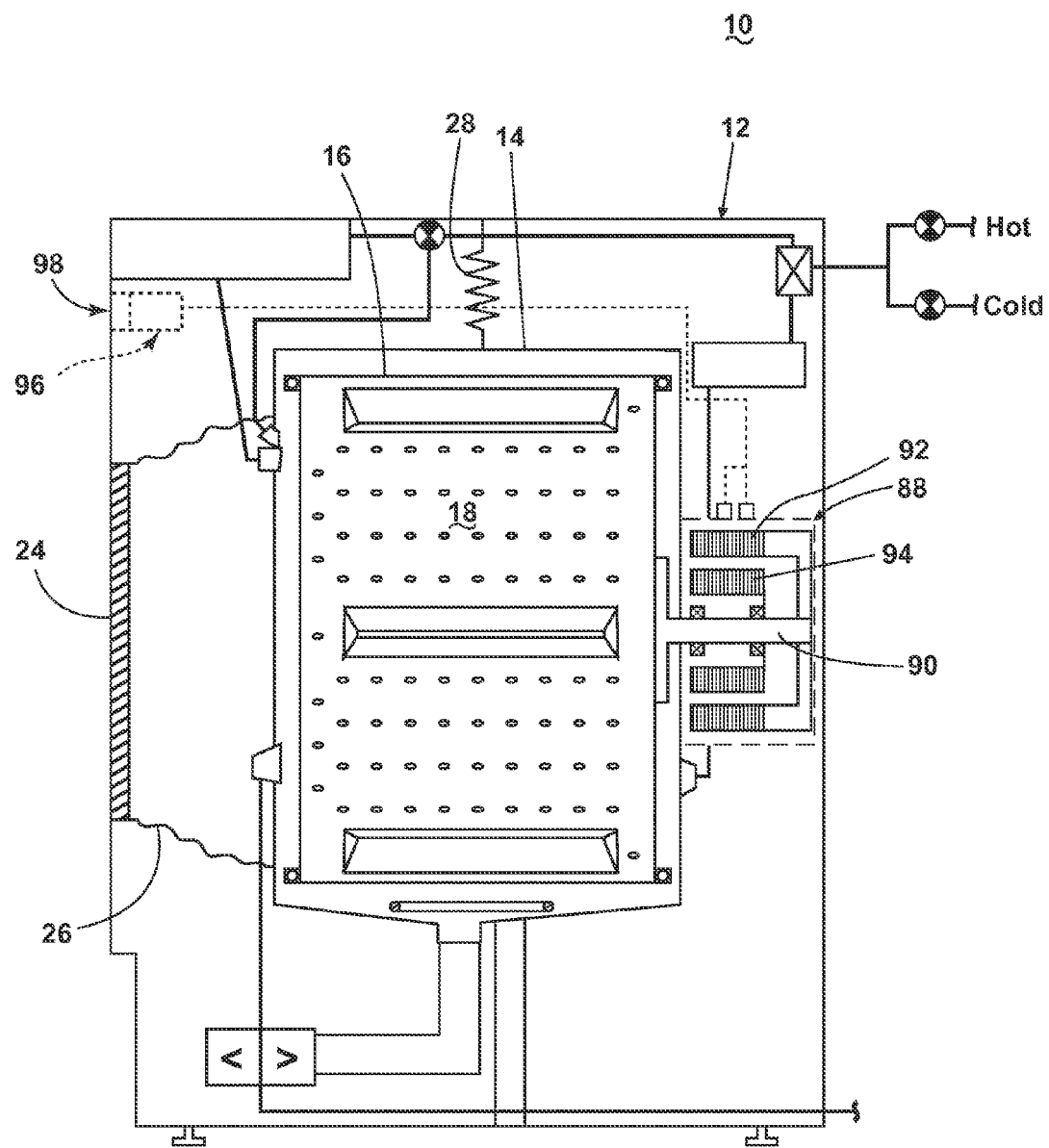
FIG. 1 is a schematic view of a laundry treating appliance in the form of a washing machine according to an embodiment of an environment of the invention.

FIG. 1 is a schematic view of a laundry treating appliance showing one embodiment of an environment in which the invention operates. The laundry treating appliance may be any appliance which performs a cycle of operation to clean or otherwise treat items placed therein, non-limiting examples of which include a horizontal or vertical axis clothes washer; a combination washing machine and dryer; a tumbling or stationary refreshing/revitalizing machine; an extractor; a non-aqueous washing apparatus; and a revitalizing machine.

The laundry treating appliance of FIG. 1 is illustrated as a washing machine 10, which may include a structural support system comprising a cabinet 12 which defines a housing within which a laundry holding system resides. The cabinet 12 may be a housing having a chassis and/or a frame, defining an interior that encloses components typically found in a conventional washing machine, such as motors, pumps, fluid lines, controls, sensors, transducers, and the like. Such components will not be described further herein except as necessary for a complete understanding of the invention.

The laundry holding system comprises a tub 14 supported within the cabinet 12 by a suitable suspension system and a drum 16 provided within the tub 14, the drum 16 defining at least a portion of a laundry treating chamber 18.

The laundry holding system may further include a door 24 which may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14.

The washing machine 10 may further include a suspension system 28 for dynamically suspending the laundry holding system within the structural support system.

The washing machine 10 also includes a drive system for rotating the drum 16 within the tub 14. The drive system may include a motor M, which may be directly coupled with the drum 16 through a drive shaft 90 to rotate the drum 14 about a rotational axis during a cycle of operation. The motor M may be a brushless permanent magnet (BPM) motor having a stator 92 and a rotor 94. Alternately, the motor M may be coupled to the drum 16 through a belt and a drive shaft to rotate the drum 16, as is known in the art. Other motors, such as an induction motor or a permanent split capacitor (PSC) motor, may also be used. The motor M may rotate the drum 16 at various speeds in either rotational direction.

The washing machine 10 also includes a control system for controlling the operation of the washing machine 10 to implement one or more cycles of operation. The control system may include a controller 96 located within the cabinet 12 and a user interface 98 that is operably coupled with the controller 96. The user interface 98 may include one or more knobs, dials, switches, displays, touch screens and the like for communicating with the user, such as to receive input and provide output. The user may enter different types of information including, without limitation, cycle selection and cycle parameters, such as cycle options.

The controller 96 may include the machine controller and any additional controllers provided for controlling any of the components of the washing machine 10. For example, the controller 96 may include the machine controller and a motor controller. Many known types of controllers may be used for the controller 96. The specific type of controller is not germane to the invention. It is contemplated that the controller is a microprocessor-based controller that implements control software and sends/receives one or more electrical signals to/from each of the various working components to affect the control software. As an example, proportional control (P), proportional integral control (PI), and proportional derivative control (PD), or a combination thereof, a proportional integral derivative control (PID control), may be used to control the various components.

Figure 2:
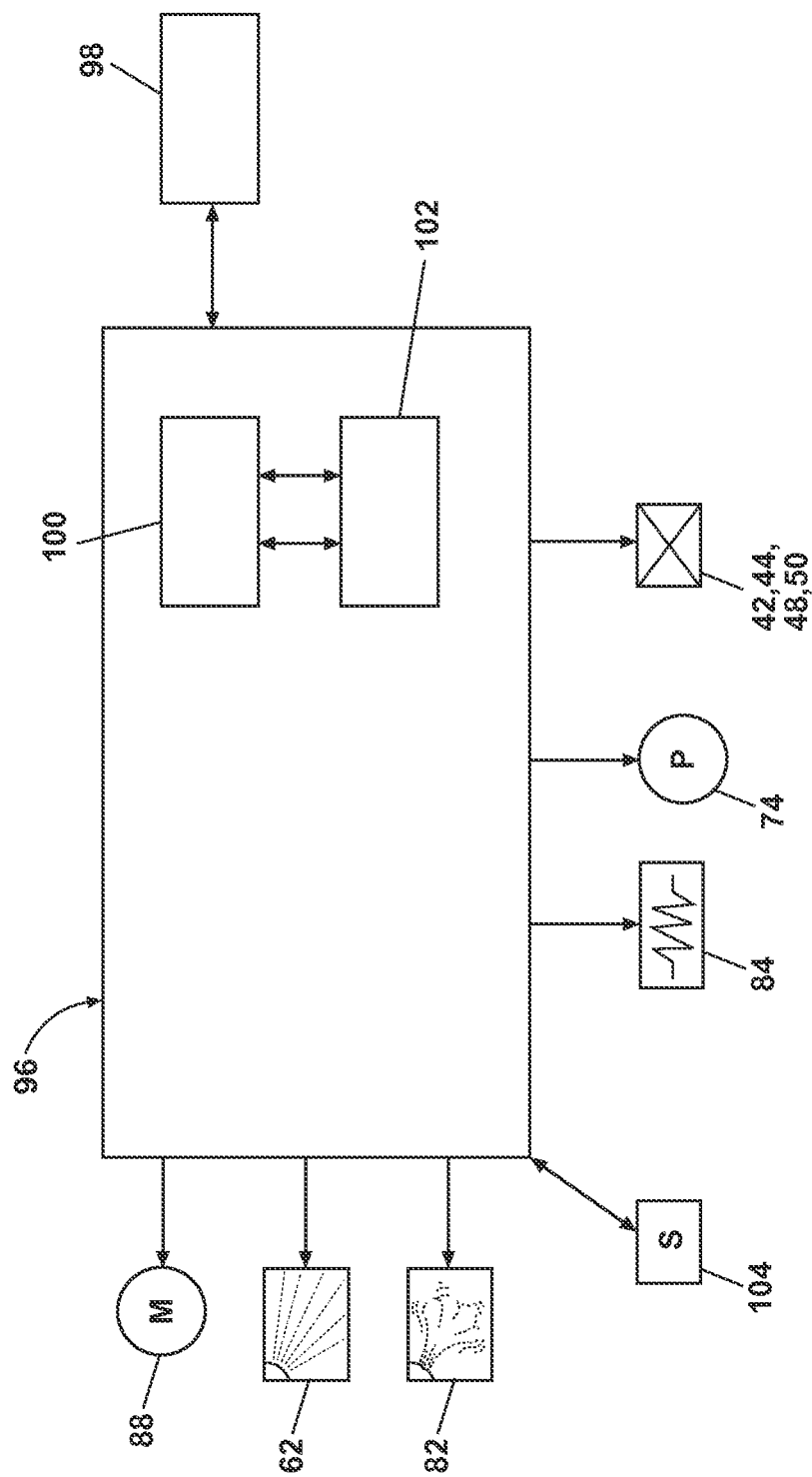
FIG. 2 is a schematic of a control system of the laundry treating appliance of FIG. 1 according to an embodiment of the invention.

As illustrated in FIG. 2, the controller 96 may be provided with a memory 100 and a central processing unit (CPU) 102. The memory 100 may be used for storing the control software that is executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 100 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input.

The controller 96 may be operably coupled with one or more components of the washing machine 10 for communicating with and controlling the operation of the component to complete a cycle of operation. For example, the controller 96 may be operably coupled with the motor 88.

The controller 96 may also be coupled with one or more sensors 104 provided in one or more of the systems of the washing machine 10 to receive input from the sensors, which are known in the art and not shown for simplicity. One non-limiting example of sensors 104 that may be communicably coupled with the controller 96 include a motor torque sensor, which may be used to determine a variety of system and laundry characteristics, such as laundry load inertia or mass.

In one example, one or more load amount sensors 106 may also be included in the washing machine 10 and may be positioned in any suitable location for detecting the amount of laundry, either quantitative (inertia, mass, weight, etc.) or qualitative (small, medium, large, etc.) within the treating chamber 18. By way of non-limiting example, it is contemplated that the amount of laundry in the treating chamber may be determined based on the weight of the laundry and/or the volume of laundry in the treating chamber. Thus, the one or more load amount sensors 106 may output a signal indicative of either the weight of the laundry load in the treating chamber 18 or the volume of the laundry load in the treating chamber 18.

In one example, the amount of laundry within the treating chamber 18 may be determined based on motor sensor output, such as output from a motor torque sensor. The motor torque is a function of the inertia of the rotating drum and laundry. There are many known methods for determining the load inertia, and thus the load mass, based on the motor torque. It will be understood that the details of the load amount sensors are not germane to the embodiments of the invention and that any suitable method and sensors may be used to determine the amount of laundry.

The previously described washing machine 10 may be used to implement one or more embodiments of the invention. The embodiments of the method of the invention may be used to control the operation of the washing machine 10 to control the speed of the motor 88 to control the movement of the laundry within the laundry treating chamber 18 to provide a desired mechanical cleaning action.

Figure 3:
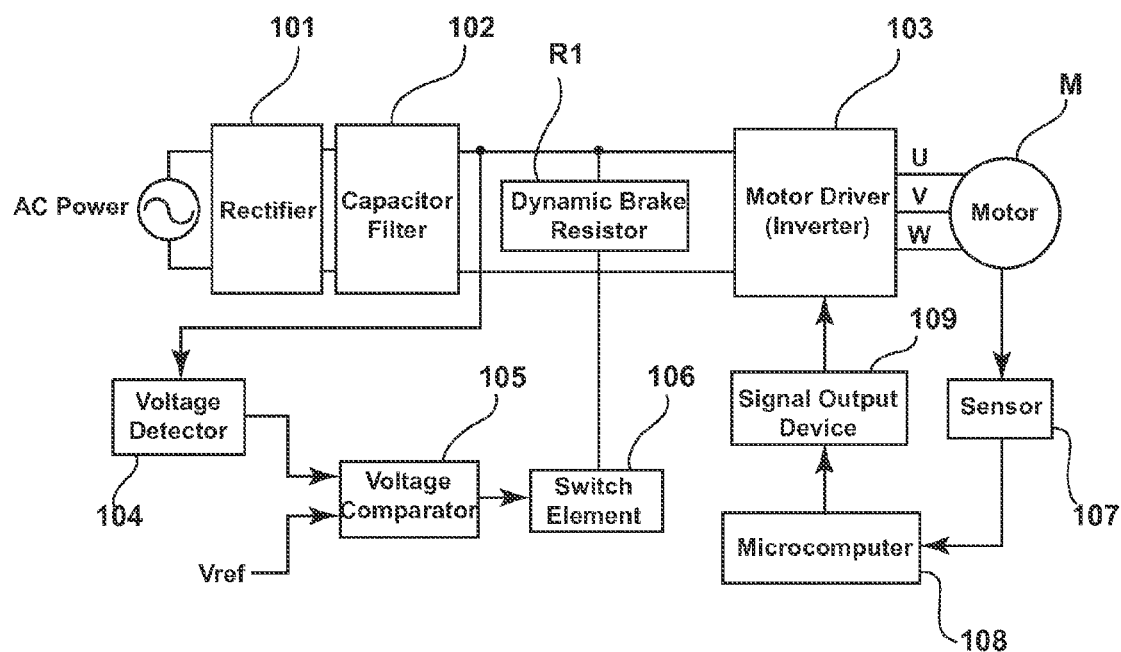
FIG. 3 is a schematic block diagram of a known system for braking a washing machine.

In one form of control the speed of the motor is adjusted to cause the drum to decelerate, also sometimes known as "active braking." FIG. 3 illustrates a conventional braking system of the prior art. Commercial AC power supplied from an outside power source is converted by a rectifier 101 into DC voltage which is then smoothed by a capacitor filter 102 before being supplied to a motor driver 103. The motor driver 103 converts the DC voltage smoothed by the capacitor filter 102 to drive the motor M. The motor M may be a three phase brushless DC motor. During a normal washing operation, current flows in a discharged direction from the capacitor filter 102 to the motor. M as the motor becomes the load.

If the lid is opened or an unbalance state of the tub is detected, the rapidly rotating motor M must be braked to quickly stop the tub. During active braking, the motor M becomes a power generator and current flows from the motor to the capacitor filter 102 due to the induction electromotive power generated from the motor. The problem is that increased voltage level generated by the power from the motor M may rise to a level exceeding the inner voltage of the designed circuit damaging the peripheral circuit and devices.

Therefore, the conventional system is equipped with a voltage detector 104, a voltage comparator 105, a dynamic braking resistor R1 in order to discharge excess voltage in the system resulted from braking of the motor M, and a microcomputer 108. The voltage detector 104 measures the voltage between the capacitor filter 102 and the motor M, and the measured voltage is delivered to the voltage comparator 105. Thereafter, the voltage comparator 105 compares the voltage between a reference voltage $V_{ref}$ and a detected voltage $V_{dc}$ measured by the voltage detector 104. The result of comparison is then outputted to a switching element 106. If the detected voltage $V_{dc}$ exceeds the reference voltage $V_{ref}$, the switching element 106 turns "on" and the braking resistor R1 is activated. As a result, excess voltage generated between the capacitor filter 102 and the motor M does not flow to the capacitor filter 102, but instead to the dynamic braking resistor R1 where it is discharged into thermal energy, this preserving the design voltage level at the rectifier and capacitor. Meanwhile, the microcomputer 108 takes speed signals of the motor M from a sensor 107 and controls the operation of the motor M through a signal output device 109.

If the detected voltage $V_{dc}$ between the capacitor filter 102 and the motor M is lower than the reference voltage $V_{ref}$, then the braking resistor R1 is turned "off" by the switching element 106. Current generated by the motor M is then allowed to flow to the capacitor filter 102 and not to the dynamic braking resistor.

Figure 4:
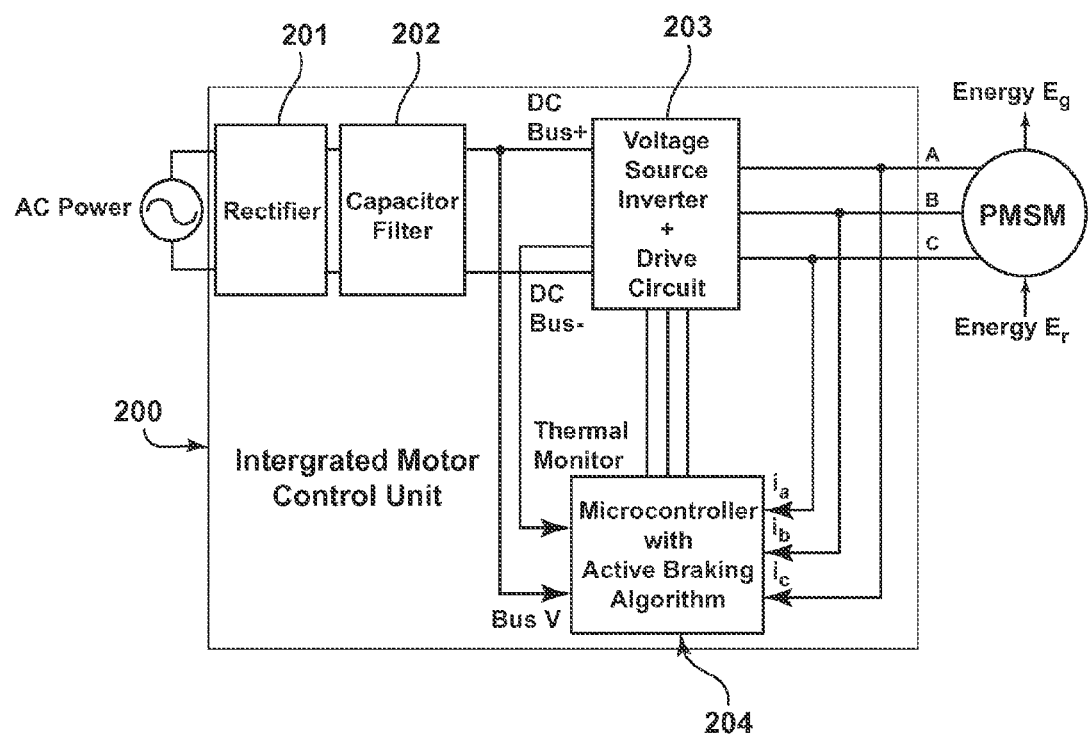
FIG. 4 is a schematic block diagram of a system for braking a washing machine according to a first embodiment of the invention.

In the present invention, active braking is accomplished via the use of direct torque control. Consequently, braking torque can be maximized without the use of additional braking resistors or position sensors. Looking now at FIG. 4, an embodiment of a system incorporating the invention can be seen in an integrated motor control unit 200. Commercial AC power supplied from an outside power source is converted in the integrated motor control unit 200 by a rectifier 201 into DC voltage which is then smoothed by a capacitor filter 202 before being supplied to a motor driver 203. The motor driver 203 converts the DC voltage smoothed by the capacitor filter 202 to drive the motor SM, which may be a permanent magnet synchronous motor in the form of a three phase brushless DC motor. During a normal washing operation, current flows in a discharged direction from the capacitor filter 202 to the motor SM in three phase AC voltage A, B, and C as the motor becomes the load.

Figure 5:
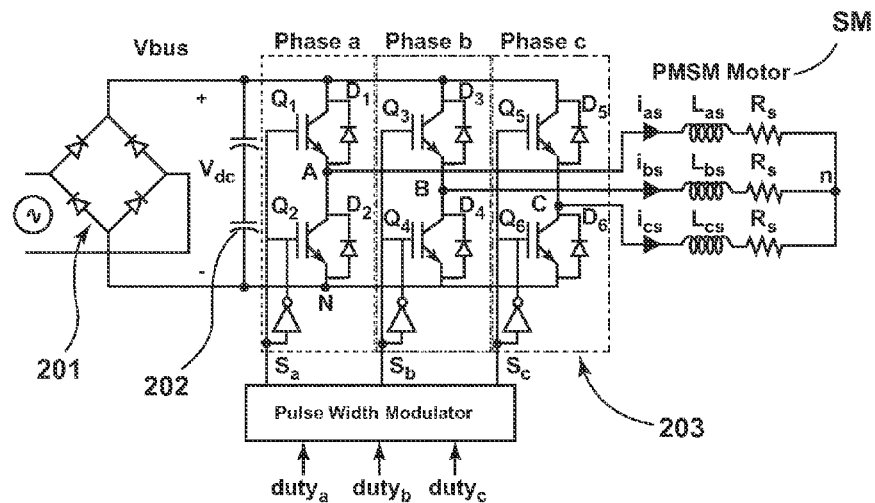
FIG. 5 is a circuit diagram of the motor drive of the system of FIG. 4.

The integrated motor control unit 200 also includes a microcontroller 204 that controls the motor driver 203 using an active braking algorithm as described below, current inputs $i_a$, $i_b$, and $i_c$, to the motor M, and bus voltage V from the capacitor filter 202. The microcontroller 204 also takes input from a thermal monitor. Looking also at the circuit diagram in FIG. 5, the motor driver 203 includes switching devices Q1 to Q6 in order to control the voltage or the current capacity and the frequency supplied to the motor SM via the capacitor filter 202. The switching device Q1 to Q6 is a high-speed switching device such as IGBT (Insulated Gate Bipolar Transistor) and comprises high-voltage sections Q1, Q2, and Q3 individually paired with corresponding low-voltage sections and Q4, Q5, and Q6, respectively, to supply the specified AC voltage to the corresponding phase A, B, and C of the motor SM. The switching device Q1 to Q6 is off when the motor SM is actively braking, so that current flows through the diodes D1 to D6 that are connected in reverse parallel to the switching device Q1 to Q6. The signal transferred to the motor driver 203 from the microcomputer 204 is a PWM (Pulse Width Modulation) control signal which controls the on/off functions of each switching device Q1 to Q6 of the motor driver 203 and the diodes D1 to D6.

The aforementioned active braking algorithm in the microcontroller 203 utilizes control variables for stator flux ($\lambda_d$) and torque ($T_u$). During the braking process for any motor, there are two operation modes: a voltage mode (e.g., when the motor SM is at high speed) and a current mode (e.g., when the motor SM is at low speed). The operating regions for active braking are thus determined by the motor speeds, and nominal y-axis and d-axis reference stator fluxes are generated, satisfying voltage limit, inverter current limit, and power limit conditions.

Any given motor will have parameters of angular velocity ω, maximum torque T, and load angles δ for different speeds. The energy dissipated on the stator resistors can be calculated from $$P_r = \frac{3}{2} R_s |i_s|^2,$$

where $R_s$=stator resistance, and $i_s$=stator current.

The energy produced by active braking can be calculated from $$P_g = T_g * \omega_m = \frac{3}{2} \frac{|\lambda_s||\lambda_y|}{L_s} * \omega * \sin\delta,$$

where $P_g$=generative energy, $T_g$=applied torque, $\omega_m$=angular velocity of the motor, λ=stator flux, L=stator inductance, and δ=load angle.

Figure 6:
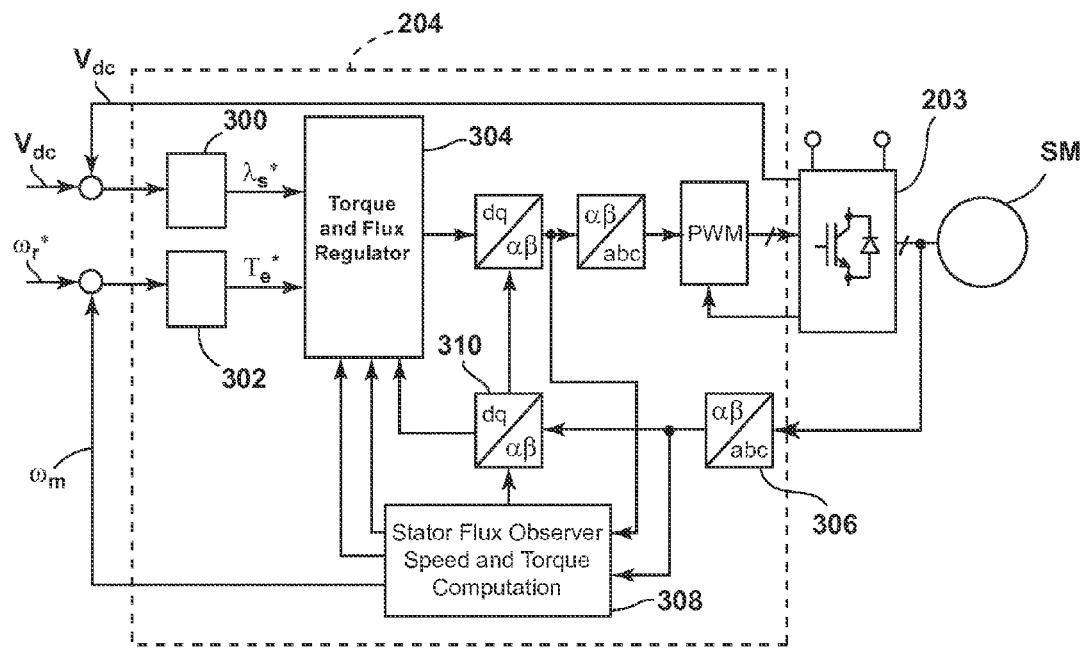
FIG. 6 is a schematic illustration of the signal processing in the system of FIG. 4.

FIG. 6 illustrates an exemplary signal processing in the microcontroller 204 to apply the foregoing algorithm. A reference signal $V_{dc}$*, in the voltage controller acts as an upper limit for the dc link capacitor voltage $V_{dc}$ generated from the inverter 203 when the motor SM is actively braking, i.e., generating current as an inductive device. Another reference signal $\omega_m$* reflects a reference command speed of the motor M against which the observed speed $\omega_m$ is compared. Proportional integral controls 300, 302 generate respective flux $\lambda_d$* and torque $T_u$* reference signals to a torque and flux regulator 304. Three phase current from the motor SM is observed at a stator flux observer 308 where speed and torque is also computed and sent to the torque and flux regulator 304. The stator core losses and inverter losses also absorb braking energy, and this increases the braking power in the voltage controller as at 310. The additional braking power generated from the voltage controller is compensated to the nominal braking power, while limiting the dc link capacitor voltage to $V_{dc}$*, which is accommodated in the PWM signal sent to the inverter 203. If the braking power exceeds the maximum system losses, the regenerated power must be reduced in order to limit the dc link capacitor voltage.

Figure 7:
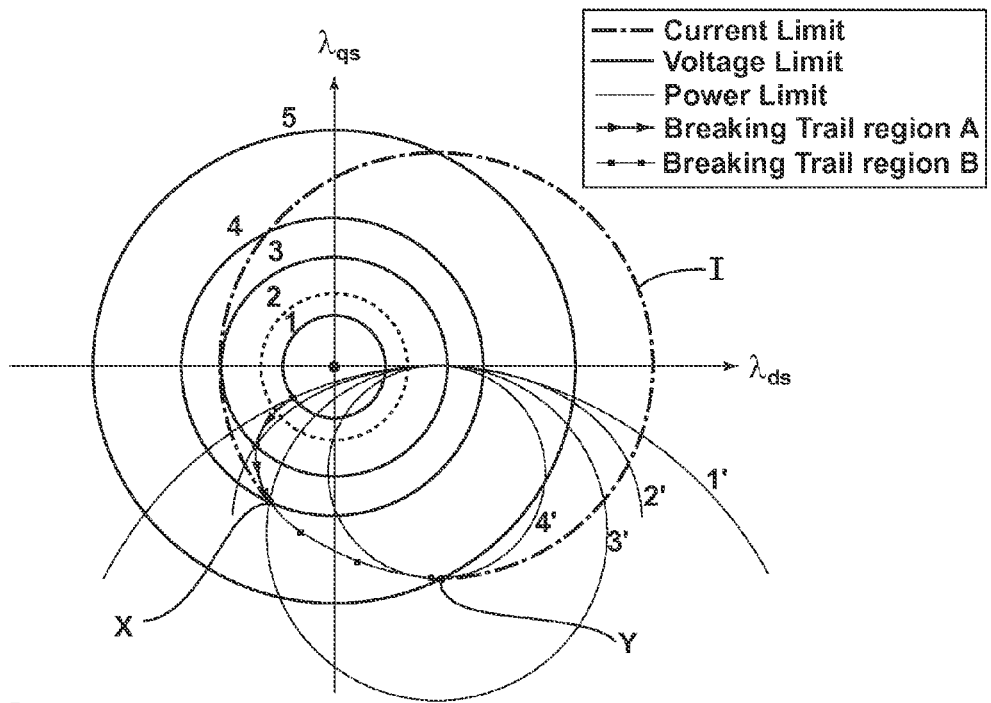
FIG. 7 is a graph of a locus flux curve with associated power limit, voltage limit and current limit curves for selected rotational speeds of the motor in the system of FIG. 4, showing the stator flux change to increase braking torque.
Figure 8:
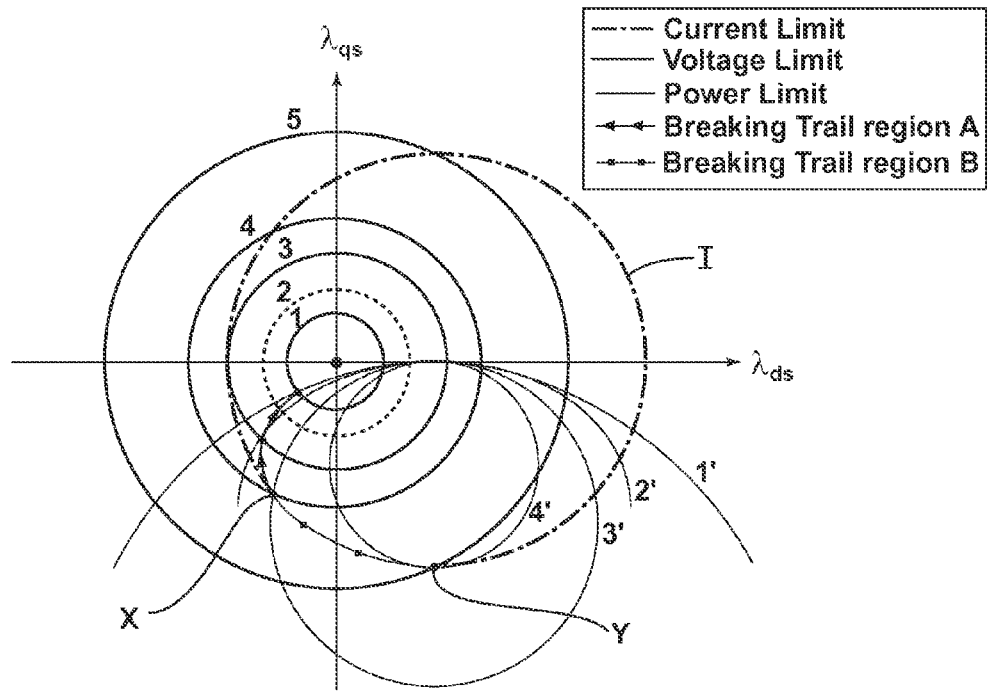
FIG. 8 is a graph of a locus flux curve with associated power limit, voltage limit and current limit curves for selected rotational speeds of the motor in the system of FIG. 4, showing the stator flux change to reduce braking torque.

FIGS. 7 and 8 illustrate flux charts showing active braking according to the invention. Braking power is mainly controlled by the nominal q-axis and d-axis stator fluxes, which must satisfy nominal power limit conditions. Assume, for example, that a motor in a washing machine has 5 set speeds. Voltage mode flux limits for each higher speed are plotted at 1, 2, 3, 4, and 5. A current mode flux limit for lower speed is plotted at I. Relevant corresponding power flux limits are plotted at 1', 2', 3', and 4'. The braking trail for region A extends between the voltage limit 1 at the highest speed to the intersection X of the curves for the voltage limit 4, the current limit I, and the power limit 3'. The braking trail region B then extends from the intersection X to the intersection Y of the curves for the voltage limit 5, the current limit I, and the power limit 4'. FIG. 7 shows the change in stator flux to increase the braking torque, and FIG. 8 shows the change in stator flux to reduce the braking torque. The operating mode is changed to the soft braking mode at low speeds with the speed proportional-integral controller.

Figure 9:
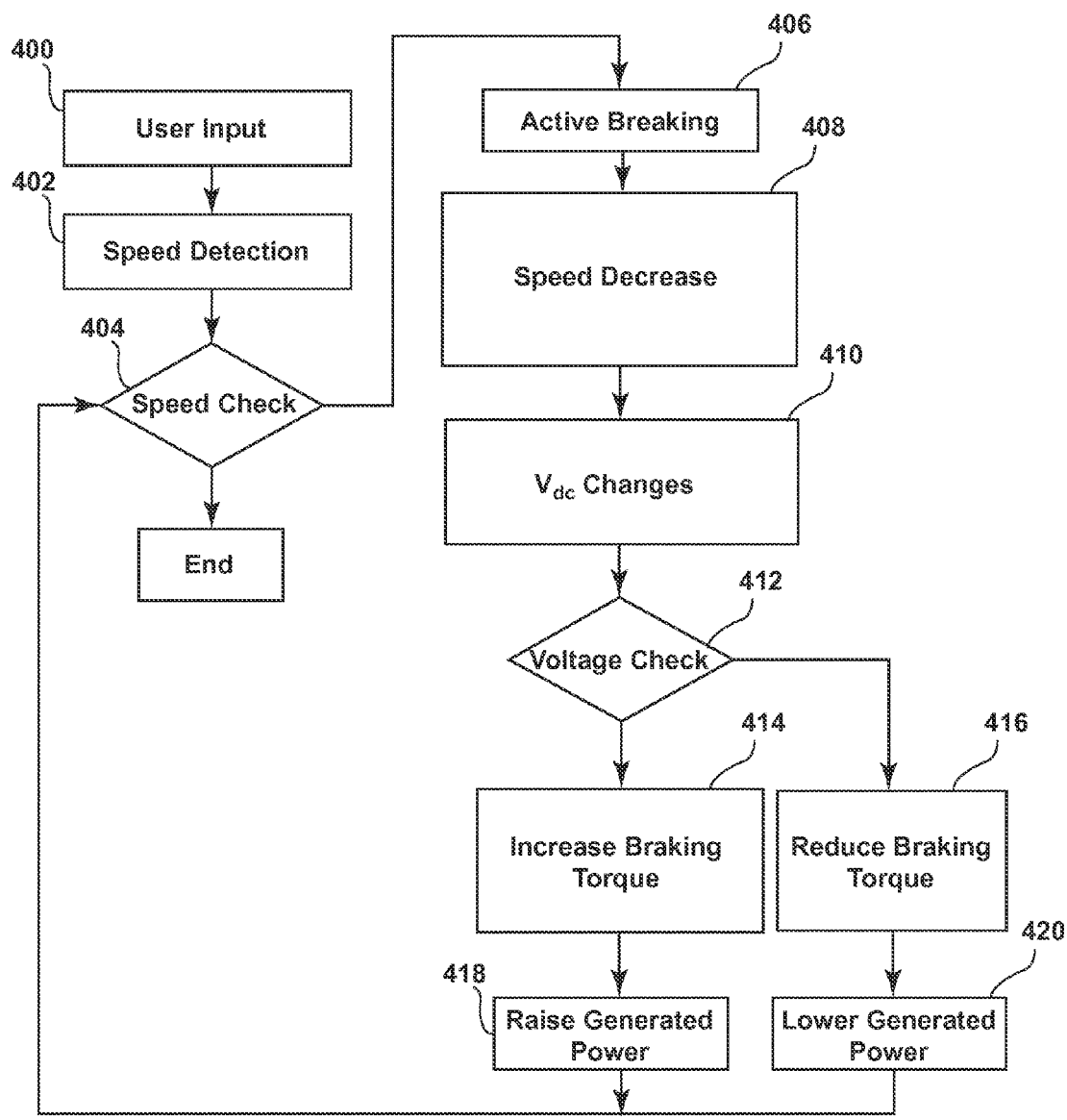
FIG. 9 is a flow chart showing an embodiment of a method of actively braking the rotation of the drum in a washing machine according to the invention.

FIG. 9 shows a process of active braking in a washing machine according to the invention. At 400 a user may inputs a command that requires a speed reduction, as for example, opening the door of the washing machine that automatically directs to the controller to halt rotation of the drum. At 402 the microcontroller 204 receives a reference motor speed $\omega_m$, determined by the user command in 400, and an actual motor speed $\omega_r$, detected by a speed sensor. The microcontroller 204 then compares the two values at 404 and if equal to or greater than 0, the process ends. However, if the reference motor speed is less than the detected motor speed ($\omega_m - \omega_r < 0$), then the process continues to 406 where active braking is initiated and torque is applied to the motor. As the motor speed decreases at 408, the stator resistors absorb energy produced by the active braking, from which the generative energy $P_g$ is calculated and the energy dissipated on the stator resistors $P_r$ is calculated. As a consequence, the voltage $V_{dc}$ from the motor driver 203 back to the capacitor filter 202 changes at 410. When $P_g$ exceeds $P_r$, the voltage $V_{dc}$ increases. When the values are equal, then the voltage $V_{dc}$ does not change. And when $P_g$ is less than $P_r$, the voltage $V_{dc}$ decreases. The microcontroller 204 compares the value of the detected voltage $V_{dc}$ to a reference voltage for the circuit $V_{ref}$ at 412, and if the detected voltage is less than the reference voltage, the stator flux is changed in block 414 as at FIG. 7 to increase the braking torque. If the detected voltage is greater than the reference voltage, the stator flux is changed in block 416 as at FIG. 8 to reduce the braking torque. Increasing the braking torque at 414 results in increasing the generative energy $P_g$ at 418 and reducing the braking torque at 416 results in decreasing the generative energy $P_g$ at 420. In a continuous loop, the microcontroller 204 returns to step 404 to compare the reference motor speed $\omega_m$ to the actual motor speed $\omega_r$. In this manner, maximum braking can be actively applied to the motor without using braking resistors and other less efficient techniques.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of actively braking a laundry treating appliance having a motor and a motor driver powered by a DC bus from a capacitor filter, comprising:
    transmitting a PWM control signal to the motor driver to apply torque to the motor;
    determining the speed of the motor,
    calculating the stator flux at the motor;
    comparing a detected voltage at the capacitor filter resulting from applying torque to the motor to a reference voltage; and
    changing the PWM control signal by applying an active braking algorithm based on the stator flux calculation and the voltage comparison.

2. The method of claim 1 wherein if the detected voltage is less than the reference voltage, the PWM control signal is changed to increase torque to the motor.

3. The method of claim 1 wherein if the detected voltage is greater than the reference voltage, the PWM control signal is changed to decrease torque to the motor.

4. The method of claim 1 wherein if the detected voltage is equal to the reference voltage, the PWM control signal is unchanged.

5. The method of claim 1 wherein the stator flux is determined subject to current, voltage and power limits.

6. An integrated motor control unit for braking a motor in a laundry treating appliance comprising:
    a rectifier to convert AC power to DC voltage;
    a capacitor filter to smooth the DC voltage from the rectifier;
    a motor driver to drive the motor based on the DC voltage from the capacitor filter; and
    a microcontroller that controls the motor driver, wherein the microcontroller has an active braking algorithm, and is configured to detect current flowing between the motor driver and the motor and to apply the active braking algorithm to brake the motor using direct torque control based on the current flow;
    wherein the algorithm includes a comparison of voltage at the capacitor filter to a reference voltage and a determination of stator flux at the motor.

7. A method of actively braking a laundry treating appliance having a motor and a motor driver, comprising:
    transmitting a PWM control signal to the motor driver to apply torque to the motor;
    determining the speed of the motor,
    calculating the stator flux;
    comparing a detected voltage resulting from applying torque to the motor to a reference voltage; and
    changing the PWM control signal based on the stator flux;
    wherein if the detected voltage is less than the reference voltage, the PWM control signal is changed to increase torque to the motor.

8. A method of actively braking a laundry treating appliance having a motor and a motor driver, comprising:
    transmitting a PWM control signal to the motor driver to apply torque to the motor;
    determining the speed of the motor,
    calculating the stator flux;
    comparing a detected voltage resulting from applying torque to the motor to a reference voltage; and
    changing the PWM control signal based on the stator flux;
    wherein if the detected voltage is greater than the reference voltage, the PWM control signal is changed to decrease torque to the motor.

9. A method of actively braking a laundry treating appliance having a motor and a motor driver, comprising:
    transmitting a PWM control signal to the motor driver to apply torque to the motor;
    determining the speed of the motor,
    calculating the stator flux;
    comparing a detected voltage resulting from applying torque to the motor to a reference voltage; and
    changing the PWM control signal based on the stator flux;
    wherein if the detected voltage is equal to the reference voltage, the PWM control signal is unchanged.

* * * * *